United States Patent [19]

Levy

[11] Patent Number: 5,683,200

[45] Date of Patent: Nov. 4, 1997

[54] DEVICE AND METHOD FOR SECURING SHAFTS ADJUSTABLY WITHIN TUBES, ESPECIALLY BICYCLE COMPONENTS

[76] Inventor: David Levy, 16 Blake, Cambridge, Mass. 02138

[21] Appl. No.: 245,703

[22] Filed: May 18, 1994

[51] Int. Cl.⁶ .............................. F16B 7/10; B62K 19/00
[52] U.S. Cl. .......................... 403/317; 403/315; 403/373; 403/371; 403/11; 403/109; 280/220; 280/278
[58] Field of Search ..................... 403/319, 317, 403/316, 315, 373, 371, 368, 367, 11, 12, 21, 109; 280/220, 287; 70/233; 74/551.1, 551.3, 551.4

[56] References Cited

U.S. PATENT DOCUMENTS

| | | | |
|---|---|---|---|
| 578,011 | 3/1897 | Girardet, Fils | 280/287 |
| 2,055,149 | 9/1936 | Hershbain | 70/233 |
| 3,235,296 | 2/1966 | Day | 403/109 X |
| 4,028,915 | 6/1977 | Stahl | 70/233 |
| 4,114,409 | 9/1978 | Scire | 70/225 |
| 4,390,300 | 6/1983 | Foster | 280/279 X |
| 4,621,873 | 11/1986 | Weinstein et al. | 301/124 R |
| 4,870,843 | 10/1989 | Lundberg | 70/233 |
| 4,878,045 | 10/1989 | Tanaka et al. | 70/233 X |
| 5,027,628 | 7/1991 | De Rocher et al. | 70/233 |

FOREIGN PATENT DOCUMENTS

| | | | |
|---|---|---|---|
| 8100478 | 9/1981 | Netherlands | 70/233 |
| 639177 | 10/1983 | Switzerland | 403/109 |

Primary Examiner—Anthony Knight

[57] ABSTRACT

One end of a flexible cable of specified length attached to the end of a shaft and the other end attached to a light-weight and disengageable restraint anchor with a wedge-shaped cross section within a tube. The shaft cannot be removed from the tube, nor can cable be cut, because the anchor is located at a depth in tube greater than the specified length of cable. Anchor is comprised of an inner and an outer piece and operably attached to cable via the inner piece. Outer surface of outer piece essentially conforms to the tube inner diameter. During normal operation (random vibration and impact) the anchor is held in a specific location by a low-force radial force means comprised of a metal snap ring pressing outwards on outer piece. During an undesired removal, the inner piece and outer piece together provide a high-force radial constraint by means of wedge-shaped cross section such that any amount of tension on cable will be insufficient to move anchor from specified location. In order to remove shaft, the wedge-function of the inner and outer pieces are circumvented by reorienting the inner piece or an inner piece lock by electric, gravitational, or magnetic means, preferably by re-orienting the entire shaft and tube assembly in space.

10 Claims, 2 Drawing Sheets

(Partial View)

DEVICE AND METHOD FOR SECURING SHAFTS ADJUSTABLY WITHIN TUBES, ESPECIALLY BICYCLE COMPONENTS

FIELD OF THE INVENTION

This invention is in the field of preventing the undesired removal of a shaft from within a tube, particularly the seat and handlebar assemblies from a bicycle.

BACKGROUND OF THE INVENTION

We live in an age when items of value must be secured. Bicycles are notorious in this respect because they are of high value and commonly left unattended. A thief needn't steal the whole bicycle to take something of value. The most commonly stolen component assembly is the seat and seat post. To prevent such a theft, many bicycle owners remove the seat assembly and carry it with them when they leave their bicycles, at great inconvenience. Another commonly stolen component assembly includes the handlebar stem, handlebars, brake levers, and shifters. Although more expensive, this component assembly is less frequently stolen due to the fact that several cables attach it to the bicycle. And for the same reason the handlebar set cannot be temporarily detached to preclude theft.

The prior art includes several lockable quick-release mechanisms to secure the removable portions of a bicycle, namely U.S. Pat. Nos. 5,027,628 to De Rocher et al., 4,028,915 to Stahl, 4,114,409 to Scire and 4,621,873 to Weinstein et al. All these mechanisms are made of metal and therefore unnecessarily heavy for the task. This is a serious design weakness as weight is of primary concern to the bicyclist. Further, the mechanisms described in these patents require the use of a key to adjust the seat, requiring the cyclist to carry said key and to produce it each time an adjustment is made. Such a requirement is at best awkward and inconvenient. If the key is lost, a very serious problem is presented. Yet further, these mechanisms are more expensive than the present invention. Yet still further, while such mechanisms could prevent the theft of a seat post, the method cannot be used to prevent the theft of the handlebar assembly.

There are several solutions outside the patent literature. A standard security cable may be used to attach the seat post to the bicycle frame. This solution is heavy, awkward and ineffective as the cable may be easily cut by a standard bolt cutter. A compromise solution is sold by a company called Topgear in Long Beach, Calif., a short small-diameter cable specifically for the task of locking the seat to the bicycle. While much lighter than a heavy security cable, it is even less secure and only deters the casual thief.

In general, all existing cable solutions have an inherent relationship between enhanced security, and increased expense, weight and bulk. Further, existing cable solutions cannot be adapted for use with the handlebar assembly without drilling a hole into the assembly, thereby severely weakening the unit.

The seat post or handle bar stem could be permanently and rigidly attached to the frame, but there are many reasons why adjustability is desirable: misadjustment during initial set up; growth of the rider; use of the bicycle by two persons; preparing the bicycle for shipment, or most commonly for comfort during different riding conditions. Therefore, the goal of easy adjustability is in direct conflict with the goal of permanent attachment.

Similar problems exist in other shaft and tube systems.

What is desirable is to prevent the undesired removal of a shaft from within a tube, particularly the removal of a seat post and handlebar stem from a bicycle, without impeding the adjustability of the shaft, without requiring the use of a key, without adding appreciable weight or cost, without requiring special tools or skills to install, and in such a way that these components may be removed by the owner at will, again not using special tools. Ideally the solution will allow greater security than any existing cable solution and yet use a thinner, lighter cable.

SUMMARY OF THE INVENTION

In this invention the above limitations are overcome and objects and advantages achieved by limiting the travel of the shaft (in the case of a bicycle the seat post or the handlebar stem) to remain within the confines of the tube. A flexible cable allows the shaft to move freely within the tube, but the length of the cable is selected to disallow the shaft from leaving the confines of the tube. Since the cable cannot be exposed, it can be made of an extremely light material with a high tensile strength, such as a nylon cord. Since the cord is inaccessible, it is impossible to cut.

The upper end of the cable is secured to the shaft by any conventional means. The preferred embodiment uses an expansion bolt for shafts with hollow interiors and a eyebolt for solid shafts. Other mechanisms, such as the anchor described below are also viable options for securing the upper end of the cable to the shaft.

The lower end of the cable is retained within the tube by a plastic anchor assembly. The preferred embodiment uses a two-piece design. The anchor assembly may be easily inserted within the tube during initial assembly, but impossible to retract without turning the entire bicycle at a 90° angle. Even if a thief realizes that the present invention is being employed, it is untenable that the thief could tilt the bicycle to the 90° position (or farther) while the bicycle is locked in the traditional way.

The inner piece of the aforementioned two-piece assembly is essentially the bottom portion of an upwardly pointing conic shape with a slope of approximately 3°–15°. The cord attaches to the smaller end of the conic. A ledge is molded into the inner piece near the thinnest section of the conic around its circumference, in a bicycle, it would be near the top. The purpose of the ledge will be explained after describing the outer piece.

The outer piece is essentially a thin, annular ring with a cylindrical exterior surface with a frustum interior to accommodate the upwardly pointing conic of the inner piece. This shape can be approximated by a plurality of pieces which act in unison. The diameter of the outer surface conforms to the diameter of the tube. The conformity is ensured by a split along one edge of the outer piece, allowing it to expand and contract radially. The bottom edge of the outer piece has a ledge around its perimeter.

The wedge-shaped interface between the inner and outer pieces causes a large radial force when the cable attached to the nose of the inner piece is stressed by the action of trying to remove the shaft. This radial force then generates a frictional force between the outer piece and the tube which is greater than or equal to the tension in the cable, making it impossible to remove the anchor (and hence the shaft) from the tube.

However, the owner may remove the shaft by loosening the binder bolt, lowering the shaft into the tube thereby forcing the inner piece from possible frictional engagement with the outer piece and causing it to hang from the cable in space within the tube, and then tilting the tube and shaft assembly. This causes the inner piece to rest on one edge of the conic. Slowly removing the shaft pulls on the inner piece and brings the aforementioned ledges of the inner and outer pieces into contact, disallowing the inner piece from entering the outer, whereupon the inner piece tilts upwards, pivoting upon the forward edge and cocking outside the volume of the outer piece at an angle defined by the diameters of the inner piece and the tube.

Since the inner piece is not engaged with the outer piece, no radial force is created and the anchor may be removed with the same amount of force used to insert it. In the preferred embodiment, the ledge of the outer piece is limited to 90° of the circumference, dictating that the tube must be so oriented to remove the anchor.

A variation of the invention uses a third piece as plug that prevents the inner piece from moving inwards when the plug is inside it, and a forth piece which transmits the cable force on the inner and outer pieces as a function of the orientation of the plug. When the plug is inside the inner, it cannot move inwards and the axial force is transferred into a radial force as before. When the plug is moved from within the inner piece (by inverting the tube and shaft unit) the inner piece may move inward radially. The axial force is therefore diverted primarily upon the outer piece. The anchoring mechanism is thereby defeated, allowing the shaft to be removed.

Early experiments showed that if the anchor is improperly designed, it can move downwards in the shaft due to the repeated vibration and shocks associated with normal use. Also, relaxation of the plastic over time increases the chance that the anchor will move downwards to the limit of the cable, making it impossible to remove. To overcome these problems a constant-force spring was added in the form of a conventional snap ring. The snap ring provides more than sufficient force to prevent this small piece of plastic from moving fro the desired location during the life of the product.

There are other embodiments that are minor variations of these designs, such as: integrating the two designs discussed herein, designs which use gravity to define the orientation of a pivoting feature that functions as a ledge; asymmetric wedges; spherical wedges, or wedge-shaped members enjoined by a gravity-directed locking means. The function may also be provided by a spring-loaded, or magnetically held ledge feature disengaged by impact or other accelerations. The pivoting axis may be aligned parallel with or perpendicular to the primary axis of the shaft and at a variety of locking/unlocking angles other than 90°. And these aforementioned designs are easily adapted to tubes normally oriented horizontally. An electric motor may also be used to disengage the wedge and the motor may be activated by a wireless transmission.

In summary, the present invention offers an extremely lightweight device which retains a shaft more securely than much heavier devices, weight being a critical factor to the bicycle rider. Further, the invention does not impede the adjustability of the shaft. It does not require the use of a key. And finally, does not require special tools or skills to install or remove.

REFERENCE NUMERALS IN DRAWINGS

Figure 1:
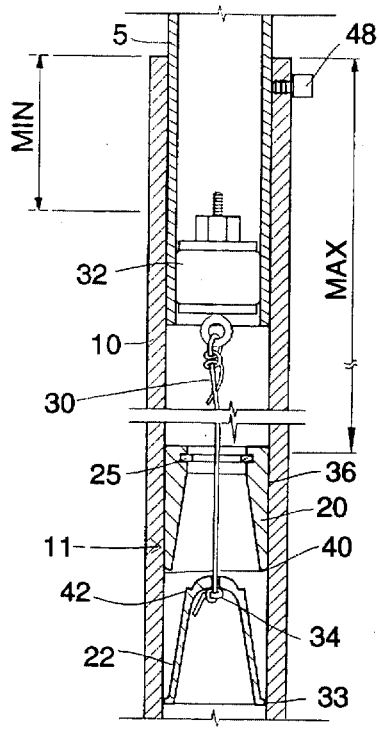
FIG. 1 shows a sectional view of the device with the shaft at a random position within the tube during normal use.

5 Shaft
10 Tube
11 Anchor
20 Outer piece
22 Inner piece
25 Snap ring
30 Cable
32 Expansion bolt
38 Slit
40 Bottom ledge
42 Top ledge
48 Binder bolt
50 Plug
51 Hook
52 Screw eye
53 Nut
54 Washer
55 Lead-in
57 Indentation

DETAILED DESCRIPTION

FIG. 1 shows a sectional view of the preferred embodiment of the device with the shaft 5 at a random position within the tube 10 during normal use. The shaft 5 must be inserted into the tube 10 at a minimum depth for proper operation. The anchor 11 rests within the tube 10 at a desired maximal depth. The outer piece 20 of the anchor 11 is held fixed by a snap ring 25 (such as manufactured by the Rotor Clip Company of Somerset N.J.) which exerts a constant outward radial force on the outer piece 20, disallowing vibration or relaxation of the plastic over time to effect the positioning of the outer piece 20 along the axis of the tube 10. A cable 30 connects to the shaft 5 with a expansion bolt 32 and to the inner piece 22 of the anchor 11 by a knot 34. The expansion bolt 32 is shown exposed, rather than sectioned for clarity. (In the case where the shaft 5 may be solid, the cable 30 would attach with an eye bolt threaded into the shaft 5). The free length of the cable 30 is approximately the maximal depth minus the minimum depth. The shaft 5 is therefore freely adjustable between the maximal depth and the minimum depth.

The inner piece 22 and outer piece 20 are injection molded of high impact Polystyrene (HIPS). The outer piece 20 is essentially a thin, annular ring with a cylindrical exterior surface 36 with a frustum-shaped interior to accommodate the upwardly pointing conic shape of the inner piece 22. The height of the outer piece 20 is approximately the same as the inner piece 22. The diameter of the exterior surface 36 of the outer piece 20 is approximately the same as the inside diameter of tube 10. The wall thickness of both the inner piece 22 and outer piece 20 is approximately $\frac{1}{8}$".

Figure 2:
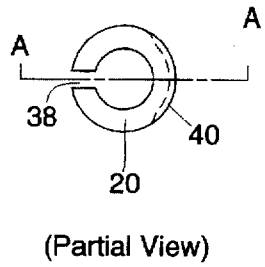
FIG. 2 shows a top view of the outer piece of the anchor.

As shown in FIG. 2, the outer piece 20 has a split 38 along one edge, allowing it to expand and contract radially to accommodate a range of tube diameters with a single size anchor 11. Note that many parts from this view have been omitted for clarity.

Again looking at FIG. 1, the bottom edge of the outer piece 20 has a bottom ledge 40 which is limited to 90° of the circumference in the preferred embodiment. Limiting the span of the bottom ledge 40 serves to limit the angles of orientation which will effect removal of the anchor. Other embodiments may have a bottom ledge 40 of any span from 1° to 360°. During normal operation the inner piece 22 may fall into the tube 10 and hang in space by cable 30. Guide 33 prevents the inner piece 22 from hitting the sides of the tube 10. The inner piece 22 has a top ledge 42 around the circumference.

Operation

The basic means of operation is that the anchor 11 will move relatively easily (approximately ten pounds of force) when pushed by the edges at the circumference of the outer piece 20, but cannot be moved when the inner piece 22 is engaged into the outer piece 20.

To install the device, one first determines the length of the cable 30 and ties a knot 34 accordingly. The anchor 11 is inserted into the shaft 5 by hand and then moved to the maximal depth by pushing on the shaft 5. The outer piece 20 will resist with approximately ten pounds of force. The shaft 5 can then be adjusted to any desired location (FIG. 1) without any encumbrance from the anchor 11.

Figure 3:
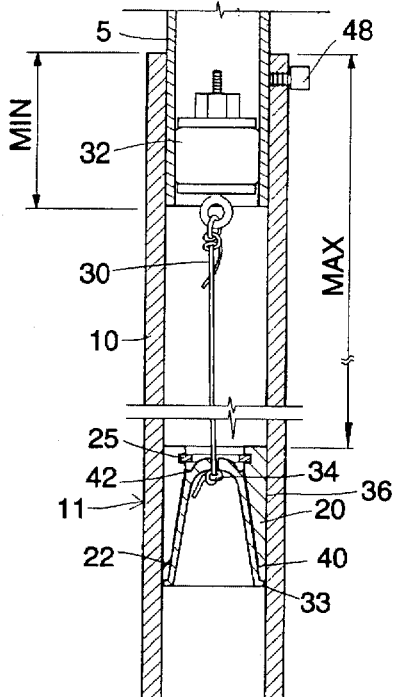
FIG. 3 shows a sectional view with the cable in tension while a two-piece anchor disallows the shaft from being removed.

At any time an unauthorized person may attempt to remove the shaft 5. FIG. 3 shows a sectional view with the cable 30 in tension as the device prevents such a removal. As the shaft 5 is moved upwards, the cable 30 pulls the inner piece 22 into the volume of the outer piece 20. The top ledge 42 does not contact the bottom ledge 40 because the guide 33 holds them in a near-concentric orientation. Once the inner piece 22 is engaged with the outer piece 20 the tension in the cable 30 is transmitted into a radial force through the slope of the wedge-shaped cross section provided by the conic shape of the inner piece 22 and the outer piece 20. The value of the frictional force opposing the tension in the cable 30 is given by:

$$\text{Friction} \geq \text{Tension} \frac{\mu}{\tan\Theta}$$

where $\mu$ equals the friction coefficient between the outer piece 20 and the tube 10 and $\Theta$ is the included angle between the major axis of the tube 10 and the slope of the interface between the inner piece 22 and the outer piece 20. Therefore, the anchor 11 will not move if:

$$\frac{\mu}{\tan\Theta} \geq 1$$

Figure 4:
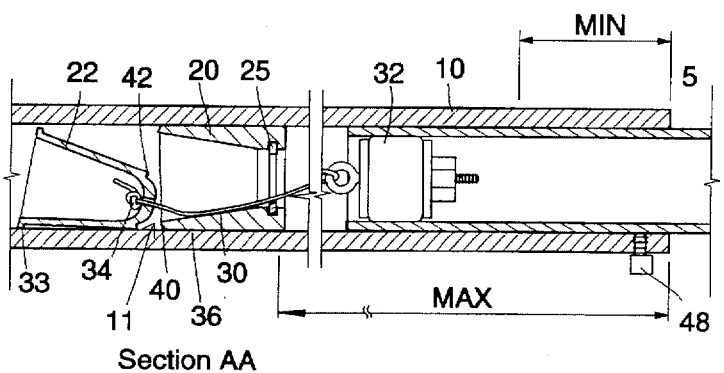
FIG. 4 shows a sectional view of the device as the inner piece is disengaged from the outer piece in preparation for removal of the shaft.

For the preferred embodiment, the selected plastic (HIPS) has a $\mu$ of approximately 0.1, indicating a maximal angle of approximately 6°. The shaft 5 may be removed (as shown in FIG. 4) by: loosening the binder bolt 48; lowering the shaft 5 into the tube 10, thereby forcing the inner piece 22 from possible frictional engagement with the outer piece 22 and causing it to hang from the cable 30 in space within the tube 10; then tilting the tube 10 and shaft 5 assembly, causing the inner piece 22 to rest on the upper ledge 42 and the guide 33.

Figure 5:
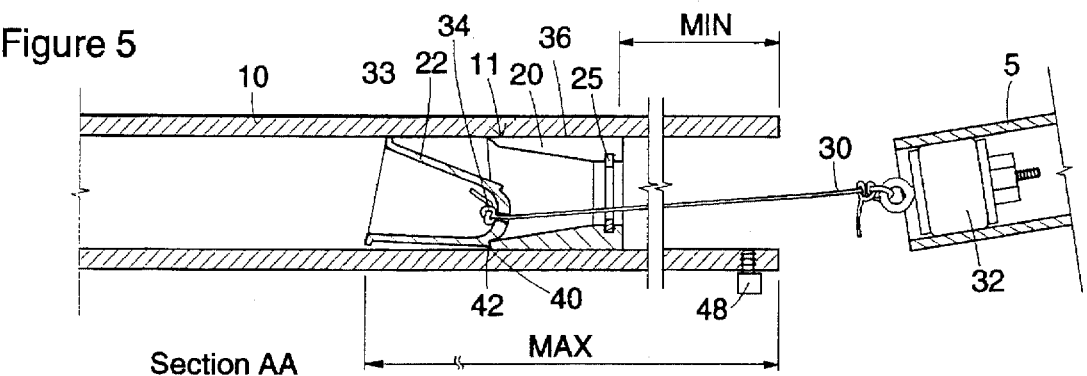
FIG. 5 shows a sectional view of the shaft being removed.

The shaft 5 is then slowly drawn from the tube 10, as shown in FIG. 5, bringing the upper ledge 42 of the inner piece 22 and the lower ledge 40 of the outer piece 20 into contact, disallowing the inner piece 22 from entering the outer piece 20, whereupon the inner piece 22 tilts upwards, pivoting upon the upper ledge 42 and cocking outside the volume of the outer piece 20 at an angle defined by the diameters of the inner piece 20 and the tube 10.

The anchor's locking mechanism is thereby circumvented and the anchor 11 may be removed with the same amount of force used to insert it.

Figure 6:
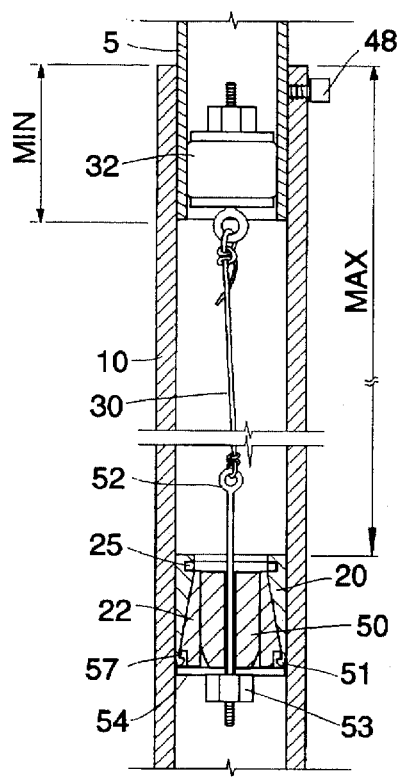
FIG. 6 shows a sectional view of a design variation incorporating a plug.

FIG. 6 shows a variation of the invention using a plug 50 to prevent inward radial motion of inner piece 22. And because the interface between inner piece 22 and outer piece 20 is angled, the plug 50 also prevents axial motion of the inner piece 22 relative to the outer piece 20. The outer piece 20 has a hook 51 which fits into indentation 57, securing the inner piece 22 and outer piece 20 together during shipment. As the cable 30 is pulled by an undesired removal of the shaft 5, the force is transmitted through the screw eye 52 to the nut 53 to the washer 54. Since the plug 50 disallows the inner piece 22 from radial motion (and hence axial motion) the geometry dictates the force transmitted through the inner piece 22, and thereby prevents removal of the shaft 5 as previously described.

Figure 7:
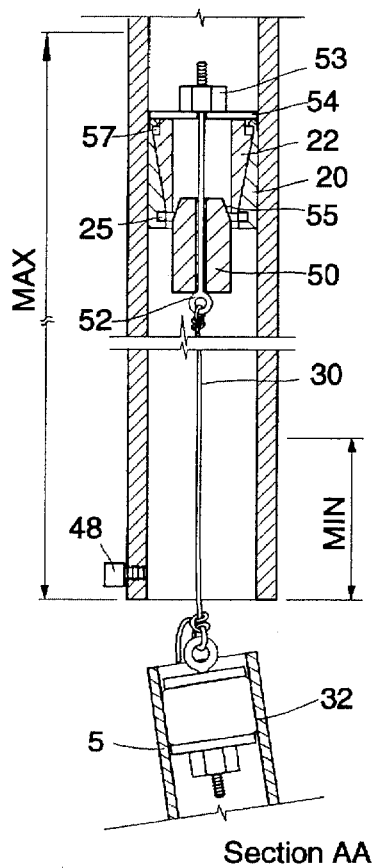
FIG. 7 shows a sectional view of a plug design as it is being removed.

In FIG. 7 the tube 10 and shaft 5 are inverted, causing the plug 50 to fall from contact with the inner piece 22 (by gravity) and thereby no longer prevent radial (and hence axial) motion of the inner piece 22. Therefore, as the force of the washer 54 is applied to the inner piece 22, it can move relatively freely and the washer force is born directly by the outer piece 20, bypassing the locking of the anchor and allowing the shaft 5 to be easily removed. A lead-in 55 facilitates reinsertion of the plug 50 into the inner piece 22 when the assembly is reinverted and provides ample linear motion for said inner piece 22 under the force of the washer 54.

While particular embodiments of the particular invention have been shown and described, it will be obvious to those skilled in the art that changes and modifications may be made without departing from this invention in its broader aspects and therefore, the appended claims are to encompass within their scope all such changes and modifications as fall within the true spirit and scope of this invention. Accordingly, the scope of the invention should not be limited to the embodiment illustrated, but by the appended claims and their legal equivalents.

I claim:

1. A method of preventing the theft of a bicycle component attached to a shaft that fits within a tube of a bicycle frame comprising the steps of:

a) measuring a maximal insertion length of said shaft prior to inserting said shaft into said tube;

b) attaching a displacement limiting means on said shaft such that said displacement limiting means shall be concealed upon assembly of said shaft into said tube, said displacement limiting means including anchor means designed to include a low-force insertion means and a high-force withdrawal means, said anchor means limiting the maximal distance of motion desired for said shaft within said tube, said maximal distance of motion is not to exceed said maximal insertion length of said shaft less a minimal length required for said shaft to be securely retained within said tube;

c) placing said displacement limiting means inside said tube;

d) inserting said shaft into said tube; and e) adjusting said shaft to a desired height.

2. The method of claim 1 further including the steps wherein said shaft may be removed from said tube by:

g) placing said bicycle in a removal orientation, said removal orientation being distinctly different from the orientation in which said bicycle is traditionally used and stored; and h) removing said shaft from said tube.

3. The method of claim 2 further including the steps wherein the range of orientations for shaft release may be limited by:

j) designing said anchor means to have a specific rotary orientation along the axis of said tube; and k) orienting said anchor means within said tube along said specified rotary orientation during step c.

4. The method of claim 2 further including the steps wherein the range of orientations for shaft release may be limited by:

j) designing said anchor means with an axial orientation.

5. A device for preventing the undesired removal of a shaft from a tube comprising: a displacement limiting means attached to said shaft such that said displacement limiting means shall be concealed upon assembly of said shaft into said tube, said displacement limiting means including a first piece and anchor means designed to include a low-force insertion means and a high-force withdrawal means, said anchor means limiting the maximal distance of motion desired for said shaft within said tube, said maximal distance of motion is not to exceed said maximal insertion length of said shaft less a minimal length required for said shaft to be securely retained within said tube when said first piece is in a first orientation relative to said anchor means, said first piece allowing said shaft to be separated from said tube when said first piece is in a second orientation relative to the anchor means.

6. The invention of claim 5 wherein a small-magnitude radial force means maintains said anchor means at a desired location.

7. The invention of claim 5 wherein said anchor means comprises:

an inner wedge means, said inner wedge means including a wedge-shaped cross section and a first contact surface sloped at approximately 3–15 degrees from the primary axis of said tube;

a tube contact means contacting said tube, said tube contact means including an outer surface with a predominantly similar perimeter shape as the interior perimeter shape of said tube, and an inner surface which includes a second contact surface, said second contact surface to mate in close contact with said first contact surface and a radial expansion means allowing radial expansion of said tube contact means; when an undesired removal of said shaft is attempted, a connection means, between said shaft and said wedge means, places an axial force upon said inner wedge means, and hence said first contact surface, which then acts upon said second contact surface and hence upon said tube contact means and thereby creates said large-magnitude radial force, said large-magnitude radial force resulting in an increased frictional force between said outer surface and said tube, said increased frictional force to oppose said axial force thereby disallowing undesired removal of the shaft.

8. The invention of claim 7 wherein said first contact surface is reoriented with respect to said second contact surface, thereby not directing said axial force towards said tube contact means and thereby allowing a low-force removal of said shaft.

9. The invention of claim 7 further including a locking means, said locking means to restrict motion of said inner wedge means.

10. The invention of claim 9 wherein said locking means may be overcome by reorienting said tube in space.

* * * * *